(12) United States Patent
Tanner

(10) Patent No.: US 8,720,385 B2  
(45) Date of Patent: May 13, 2014

(54) COMBINED RETRACTABLE LEASH AND BALL THROWER

(76) Inventor: Trae Tanner, Calgary (CA)

(*) Notice: Subject to any disclaimer, the term of this patent is extended or adjusted under 35 U.S.C. 154(b) by 274 days.

(21) Appl. No.: 13/281,294

(22) Filed: Oct. 25, 2011

(65) Prior Publication Data

US 2013/0098308 A1    Apr. 25, 2013

(51) Int. Cl.
*A01K 27/00*    (2006.01)

(52) U.S. Cl.
USPC ............................. 119/796; 119/707

(58) Field of Classification Search
CPC .................................................. A01K 27/004
USPC ......... 119/702, 707, 712, 769, 772, 779, 780, 119/781, 782, 792, 791, 793, 794, 795, 796, 119/797, 798, 799, 801; 124/20.1
See application file for complete search history.

(56) References Cited

U.S. PATENT DOCUMENTS

| | | | | |
|---|---|---|---|---|
| 209,783 | A * | 11/1878 | Warlow | 242/157 R |
| 1,585,446 | A | 5/1926 | Warwick | |
| 3,964,441 | A * | 6/1976 | Wall | 119/796 |
| 4,182,272 | A * | 1/1980 | Taff | 119/795 |
| 6,076,829 | A | 6/2000 | Oblack | |
| 6,209,531 | B1 * | 4/2001 | Boon | 124/20.1 |
| 6,401,665 | B1 * | 6/2002 | Gentile | 119/707 |
| 7,234,417 | B2 * | 6/2007 | Laird | 119/61.57 |
| D567,602 | S | 4/2008 | Choy et al. | |
| 7,686,001 | B2 | 3/2010 | Fitt | |
| 7,866,282 | B2 | 1/2011 | Simpson et al. | |
| 7,926,452 | B1 * | 4/2011 | Kim | 119/796 |
| 8,028,684 | B1 | 10/2011 | Weissmann et al. | |
| 2002/0140240 | A1 | 10/2002 | Charette | |
| 2007/0022972 | A1 * | 2/2007 | Morrison | 119/707 |
| 2007/0039563 | A1 * | 2/2007 | Keller | 119/799 |
| 2007/0056528 | A1 | 3/2007 | Schwartz | |
| 2007/0204805 | A1 * | 9/2007 | Brody | 119/796 |
| 2008/0072845 | A1 * | 3/2008 | Head | 119/789 |
| 2008/0072886 | A1 | 3/2008 | Cattlin | |
| 2008/0276883 | A1 * | 11/2008 | Perez Tomas | 119/798 |

FOREIGN PATENT DOCUMENTS

| | | |
|---|---|---|
| CA | 1184815 | 4/1985 |
| CA | 2344330 A1 | 3/2000 |
| CA | 2643904 A1 | 8/2009 |
| GB | 2435163 A | 8/2007 |

* cited by examiner

*Primary Examiner* — Rob Swiatek
*Assistant Examiner* — Ebony Evans
(74) *Attorney, Agent, or Firm* — David A. Guerra

(57) ABSTRACT

A combined retractable leash and ball thrower device for allowing a user to walk a pet and throw a ball using a single device. The device includes a housing featuring a handle, and a leash retracting mechanism enclosed in the housing. An activation element or button is used to operate the leash retracting mechanism, with a portion of the activation element being exterior of the housing. A shaft extends from the handle of the housing, with a ball receiving element located at a distal free end of the shaft. The shaft is integrally formed with the handle or the shaft may be a separate unit removably attached to the handle. The ball receiving element is integrally formed with the shaft or the ball receiving element may be a separate unit removably attached to the shaft.

12 Claims, 6 Drawing Sheets

COMBINED RETRACTABLE LEASH AND BALL THROWER

BACKGROUND OF THE INVENTION

1. Field of the Invention

The present invention relates to a combined retractable leash and ball thrower for use in connection with for allowing a user to throw a ball and walk an animal.

2. Description of the Prior Art

Combined retractable leash and ball throwers are desirable for providing a user a single unit that combines the functions of a retractable animal or pet leash, and a ball throwing device. In this, the user does not have to locate, carry and use two separate devices to walk and exercise their pet. The present invention allows the user to walk their pet to a park, field or any desirable area, and using the same unit allows the user to throw a ball and pick up a ball without bending over. It can be appreciated by one skilled in the art the benefit of the present invention and the improvement over existing retractable leashes and ball throwing devices.

There have long been leashes for controlling and holding pets during walks. Devices for restraining, controlling and limiting the distance a pet or animal can wander from a tethered point or person are well known in the art. Typically these devices are unsafe and mechanically unreliable or difficult to operate with one hand. One problem associated with such devices is that leashes occupy at least one hand of a user so that other items, which can be useful or necessary to the user, cannot easily be carried. Some training or throwing items, such as ball throwers may therefore be left behind. One may stray into an unfamiliar area with poor lighting while walking a pet. Therefore, it is while one is walking a pet that certain items are apt to be most urgently needed and yet not at hand.

Pet owners take their pets out for walks and out to parks. When out at parks or open spaces, pet owners like to throw balls for the pet to run after, retrieve, and play with, thereby providing exercise to the pet. Many pet owners like to use retractable leashes to vary the distance the dog can roam depending on their surroundings, and they like to use ball throwers to throw the ball long distances without straining their arms by repeatedly throwing the ball. A retractable pet leash in one hand and a ball thrower in the other leaves no free hand, hence the need for a combination of the two.

While the above-described devices fulfill their respective, particular objectives and requirements, the aforementioned patents do not describe a combined retractable leash and ball thrower that allows a user to throw a ball and walk an animal.

Therefore, a need exists for a new and improved combined retractable leash and ball thrower that can be used for allowing a user to throw a ball and walk an animal. In this regard, the present invention substantially fulfills this need. In this respect, the combined retractable leash and ball thrower according to the present invention substantially departs from the conventional concepts and designs of the prior art, and in doing so provides an apparatus primarily developed for the purpose of allowing a user to throw a ball and walk an animal.

SUMMARY OF THE INVENTION

In view of the foregoing disadvantages inherent in the known types of retractable animal leashes and ball throwing devices now present in the prior art, the present invention provides an improved combined retractable leash and ball thrower, and overcomes the above-mentioned disadvantages and drawbacks of the prior art. As such, the general purpose of the present invention, which will be described subsequently in greater detail, is to provide a new and improved combined retractable leash and ball thrower and method which has all the advantages of the prior art mentioned heretofore and many novel features that result in a combined retractable leash and ball thrower which is not anticipated, rendered obvious, suggested, or even implied by the prior art, either alone or in any combination thereof.

To attain this, the present invention essentially comprises a combined retractable leash and ball thrower device for allowing a user to walk a pet and throw a ball using a single device. The device includes a housing featuring a handle, and a leash retracting mechanism enclosed in the housing. An activation element or button is used to operate the leash retracting mechanism, with a portion of the activation element being exterior of the housing. A shaft extends from the handle of the housing, with a ball receiving element located at a distal free end of the shaft.

The shaft is integrally formed with the handle or the shaft may be a separate unit removably attached to the handle, allowing for a variety of different shafts to be used. The shaft may be attached to the handle using a threaded connection, a biased tab and opening connection, or a T-shaped detent and bore connection. A biased latch is used to securely and removably retain the T-shaped detent in the bore.

The ball receiving element is integrally formed with the shaft or the ball receiving element may be a separate unit removably attached to the shaft, allowing for a variety of different ball receiving elements to be used. The ball receiving element may be attached to the shaft using a threaded connection, or a biased tab and opening connection.

There has thus been outlined, rather broadly, the more important features of the invention in order that the detailed description thereof that follows may be better understood and in order that the present contribution to the art may be better appreciated.

The invention may also include a circular extension protruding from the shaft configured to engage with a clip of the leash. There are, of course, additional features of the invention that will be described hereinafter and which will form the subject matter of the claims attached.

Numerous objects, features and advantages of the present invention will be readily apparent to those of ordinary skill in the art upon a reading of the following detailed description of present, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combined retractable leash and ball thrower that has all of the advantages of the prior art retractable leashes and ball throwers and none of the disadvantages.

It is another object of the present invention to provide a new and improved combined retractable leash and ball thrower that may be easily and efficiently manufactured and marketed.

An even further object of the present invention is to provide a new and improved combined retractable leash and ball thrower that has a low cost of manufacture with regard to both materials and labor, and which accordingly is then susceptible of low prices of sale to the consuming public, thereby making such combined retractable leash and ball thrower economically available to the buying public.

Still another object of the present invention is to provide a new combined retractable leash and ball thrower that provides in the apparatuses and methods of the prior art some of the advantages thereof, while simultaneously overcoming some of the disadvantages normally associated therewith.

Even still another object of the present invention is to provide a combined retractable leash and ball thrower for allowing a user to throw a ball and walk an animal. This allows a user to use both a retractable leash and ball thrower from one hand while leaving the other hand free.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
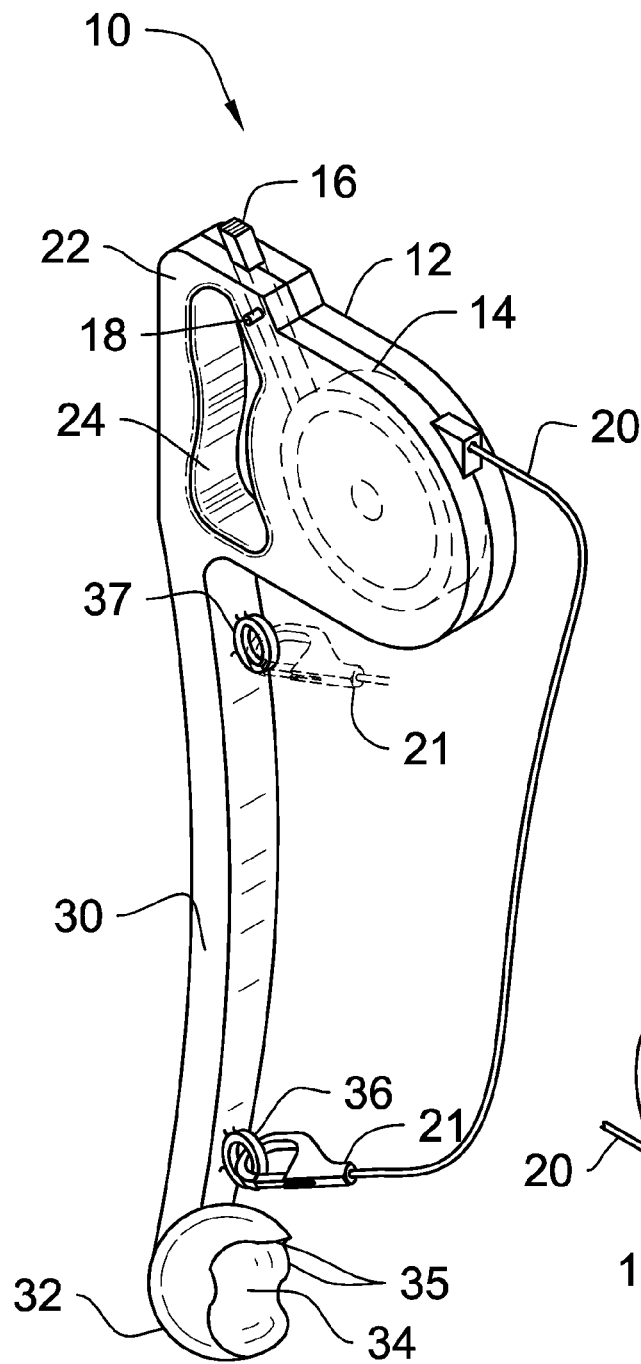
FIG. 1 is a top right perspective view of the combined retractable leash and ball thrower constructed in accordance with the principles of the present invention, with the phantom lines depicting environmental structure.

Referring now to the drawings and particularly to FIGS. 1-10, the combined retractable leash and ball thrower of the present invention is shown and generally designated by the reference numeral 10.

Figure 2:
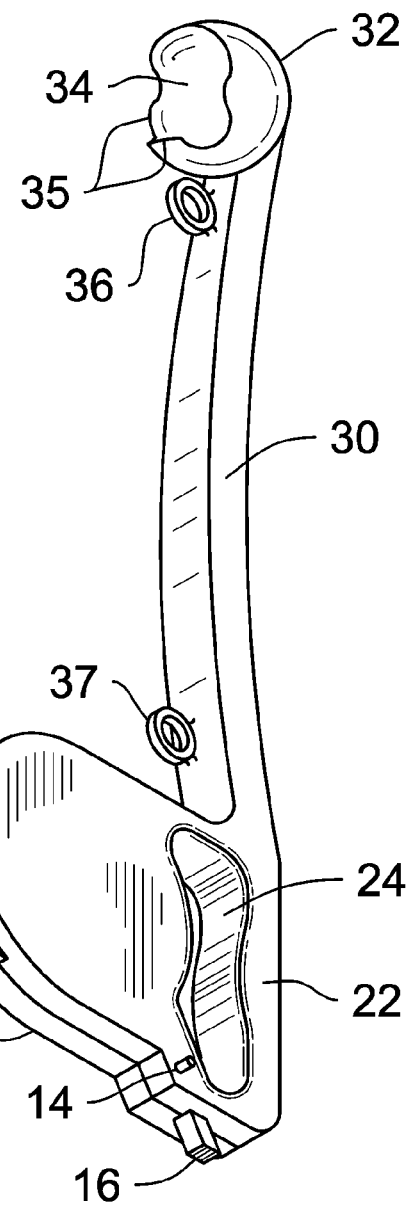
FIG. 2 is a bottom left perspective view of the combined retractable leash and ball thrower of the present invention.

In FIGS. 1 and 2, a new and improved combined retractable leash and ball thrower 10 of the present invention for allowing a user to throw a ball and walk an animal is illustrated and will be described. More particularly, the combined retractable leash and ball thrower 10 has a housing 12, a handle 22, and a ball throwing element or shaft 30 extending out from the handle 22. The housing 12 and the ball throwing element 32 is made of, but not limited to, plastics, metals, alloys, or composites.

The housing 12 has a main body that encloses a leash retracting mechanism 14. A button 16 and locking pin 18 are operational through the housing 12 to actuate and control the leash retracting mechanism 14. The housing 12 can be formed from at least two halves joined together to form the housing. The leash retracting mechanism 14 has, but not limited to, a spring biased ratcheting spool configured to retract a leash, lead or length of cord 20 into the housing 12 and around the spool. When operated by the user, the button 16 prevents the leash retracting mechanism 14 from operating or rotating, and thereby locks the leash retracting mechanism 14 in place. The locking pin 18, when activated by the user, locks the button 16 in an operational position, thereby keeping the button 16 engaged with the leash retracting mechanism 14 until the user disengages the locking pin 18 from the button 16. A portion of the button 16 and locking pin 18 extend out from the housing 12, so as to be operated by the user. The button 16 can include a spring (not shown) so as to force the button to a position that is disengaged from the leash retracting mechanism 14.

It can be appreciated that more than one leash retracting mechanism 14, button 16, locking pin 18 and leash 20 can be incorporated into the present invention, thereby allowing the user to walk two or more animals at the same time. It can also be appreciated that a shock absorbing means can be operationally engaged with the leash retracting mechanism 14 or the leash 20, for absorbing a rapid increasing in pulling force or jerk-like force from the animal attached to the leash.

The leash 20 exits the housing 12 through a hole located opposite the handle 12. It can be appreciated that the hole can have any shape or configuration that allows the lead 20 to pass therethrough. One end of the leash 20 is secured to the leash retracting mechanism 14 by any suitable means, while the free end is exterior of the housing 12 and includes or is attachable to a clip 21 or a pet collar.

The handle 22 defines an opening 24 configured and ergonomically shaped to receive the users hand and/or fingers therein. The handle 22 and opening 24 may have different shapes and configurations, such as but not limited to, being angled in relation to the longitudinal axis of the housing. Additionally, the handle 22 may include padding or messaging elements to aid the user in grasping the handle 22 or operating the present invention. Furthermore, the handle 22 may include finger receiving recesses.

The ball throwing shaft 30 extends from a surface of the housing 12 opposite the button 16. A ball receiving element 32 is located at a free distal end of the shaft 30, and defines a ball receiving opening 34 configured to receive a ball (not shown) therein.

The shaft 30 is made of a resilient, lightweight material, such as but not limited, plastics, metals, alloys or composites. The material has sufficient shape memory and flexibility so as to allow the shaft 30 to flex and force the ball out of the ball receiving element 32, and then return to its previous shape and position. The end portion of the shaft 30 opposite the handle 22 is more flexible than the end portion adjacent the handle 22, thereby acting as a spring-like member when throwing the ball or when engaging or picking up the ball from the ground. The shaft 30 has, but not limited to, a tapered configuration, and may contain a single or double curve or may be straight. Additionally, different lengths of the shaft 30 may be used to accommodate users of varying heights or lengths, and for varying degrees of flexibility. The flexibility of the shaft 30 corresponds with the amount of strength needed by the user to throw the ball or the distance the ball travels.

The ball receiving element 32 has an inner radius equal to or slightly smaller than the outer radius of the ball. In the alternative, the ball receiving element 32 has an inner radius larger than the ball with the ball receiving opening 34 having an inner radius equal to or slightly smaller than the outer radius of the ball. The ball receiving element 32 may include projections 35 formed on the edge surface of the ball receiving element 32 that forms the ball receiving opening 34. The projections 35 are curved and substantially follow the outer radius of the ball. The projections 35 are configured to bend outward to snap around the ball and hold it inside the ball receiving element 32.

The ball receiving element 32 is made from, but not limited to, the same material as of the shaft 30, and is integrally formed to the distal free end of the shaft 30. It can be appreciated that the ball receiving element 32 may be of varying shapes and configurations so as to correspond with varying types of balls.

At lease one circular extension 36 extends out from the shaft 30, and is configured so that the clip 21 of the leash 20 can be attached thereto. The circular extension 36 may be of any operable shape, and may be located anywhere on the shaft 30 or the housing 12. Optionally, the shaft 30 can include two circular extensions 36, a first circular extension 36 located adjacent or near the ball receiving element 32, and a second circular extension 37 located adjacent or near the housing 12. In a possible use, the user can secure the clip 21 to the second extension 37 and then lock the retracting mechanism 14 so that a predetermined length of the leash is deployed. The secured leash can then be used as a shoulder strap for carrying the present invention over the user's shoulder or back, or around the user's waist. In an alternate possible use, the user can secure the clip 21 to the first extension 36, thereby securing the leash 20 out of the way during a ball throwing motion of the shaft 30.

Optionally, a strap (not shown) being, but not limited to, an elastic or adjust strap can be secured to both the first and second circular extensions 36, 37 so as to be used as a carrying strap, thereby allowing the clip 21 to be secured to a collar of an animal providing the user with a hands-free option for walking the animal. The strap can be used as a shoulder strap or can be wrapped around a waist of the user. Additionally, the strap can be secured to the clothing of the user or to an alternative object, thereby producing a tether.

Since the button 16 is located opposite of the shaft 30, the user will not accidently operate the button 16 and leash retracting mechanism 14 while throwing the ball.

Figure 3:
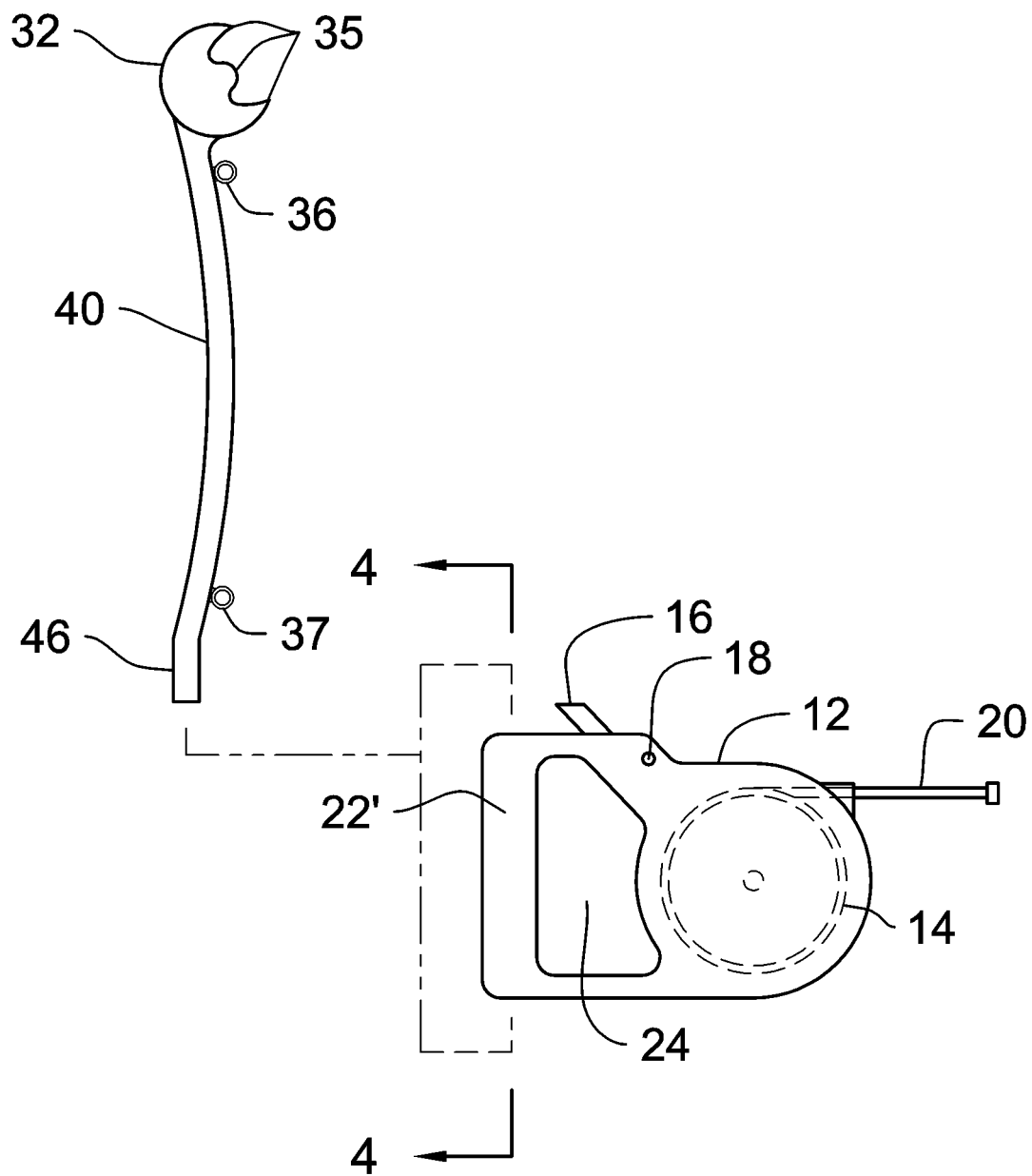
FIG. 3 is an exploded side plane view of an alternate embodiment of the combined retractable leash and ball thrower of the present invention.

FIG. 3 illustrates an alternate embodiment combined retractable leash and ball thrower including a housing 12, an alternate embodiment handle 22', and an attachable ball throwing shaft 40 configured to be removably attached to a top and/or bottom location of the handle 22'. The shaft 40 has the ball receiving element 32, the circular extension 36, and an attachment end 46 that is removably received and secured in a portion of the handle 22'.

In this embodiment, the user may optionally use the housing 12 as a standard retractable animal leash without the ball throwing shaft 40 attached thereto, thereby providing a more freely maneuverable housing 12 without the shaft 40 causing any obstruction of use. The user could attach the ball throwing shaft 40 to the handle 22' when the user wants to use the present invention to throw the ball. The user now has the option of attaching the shaft 40 to either side of the housing, thereby using the present invention as desired.

Figure 4:
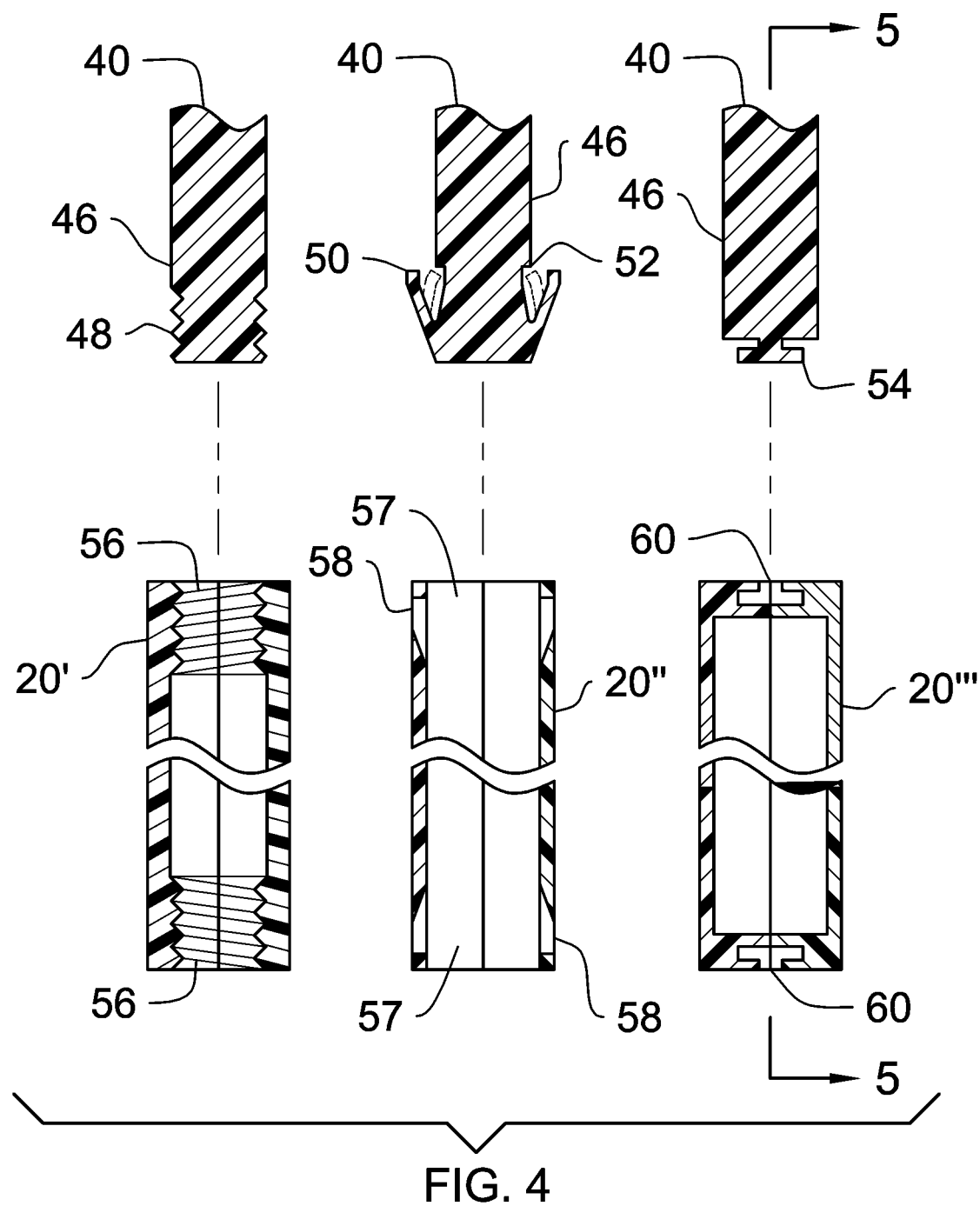
FIG. 4 is a cross sectional view of alternate shaft and handle connections of the combined retractable leash and ball thrower of the present invention, taken along line 4-4 in FIG. 3.

The attachment end 46 of the shaft 40 and its corresponding receiving portion of the handle 22' of housing 12 may be accomplished by many different configurations, as best illustrated in FIG. 4.

One embodiment of the attachment end 46 of shaft 40 features an externally threaded section 48 that securely engages with an internally threaded bore 56 defined in the top and bottom surfaces of the handle 22' of housing 12. The threaded section 48 of the shaft 40 is inserted into either threaded bore 56 of the handle 22', and then rotated to securely and removably attach the shaft 40 to the handle 22'.

Another embodiment of the attachment end 46 of shaft 40 features biased latching tabs or buttons 50 that securely engages with latch openings 58 defined in opposite sides of the handle 22" of housing 12. The attachment end 46 of the shaft 40 is inserted into either end of a bore 57 defined through the handle 22". The latch openings 58 are in communication with the bore 57. The walls of the handle 22" that define the bore 57 force the tabs 50 into recesses 52 defined in the attachment end 46 when the attachment end 46 is inserted into the bore 57. The biasing nature of the tabs 50 will force them into their respective opening 58 when the tabs 50 are aligned therewith, thereby securing the shaft 40 to the handle 22". To remove the shaft 40 from the handle 22", the user would press in the tabs 50 so they are inside the bore 50 past the latch openings 58, and then remove the shaft 40 from the bore 50. It can be appreciated that varying number and style of tabs can be used, thereby providing the user the ability to rotate the shaft 50 in multiple orientations.

A further embodiment of the attachment end 46 of shaft 40 features a T-shaped detent 54 that extends out from the distal end of attachment end 46. The T-shaped detent 54 is slidably received in a corresponding T-shaped slot 60 defined on the top and bottom surfaces of the handle 22'" of housing 12, with one side of the T-shaped slot 60 being exposed to exterior of the handle 22'" to receive a post portion of the T-shaped detent 54.

Figure 5:
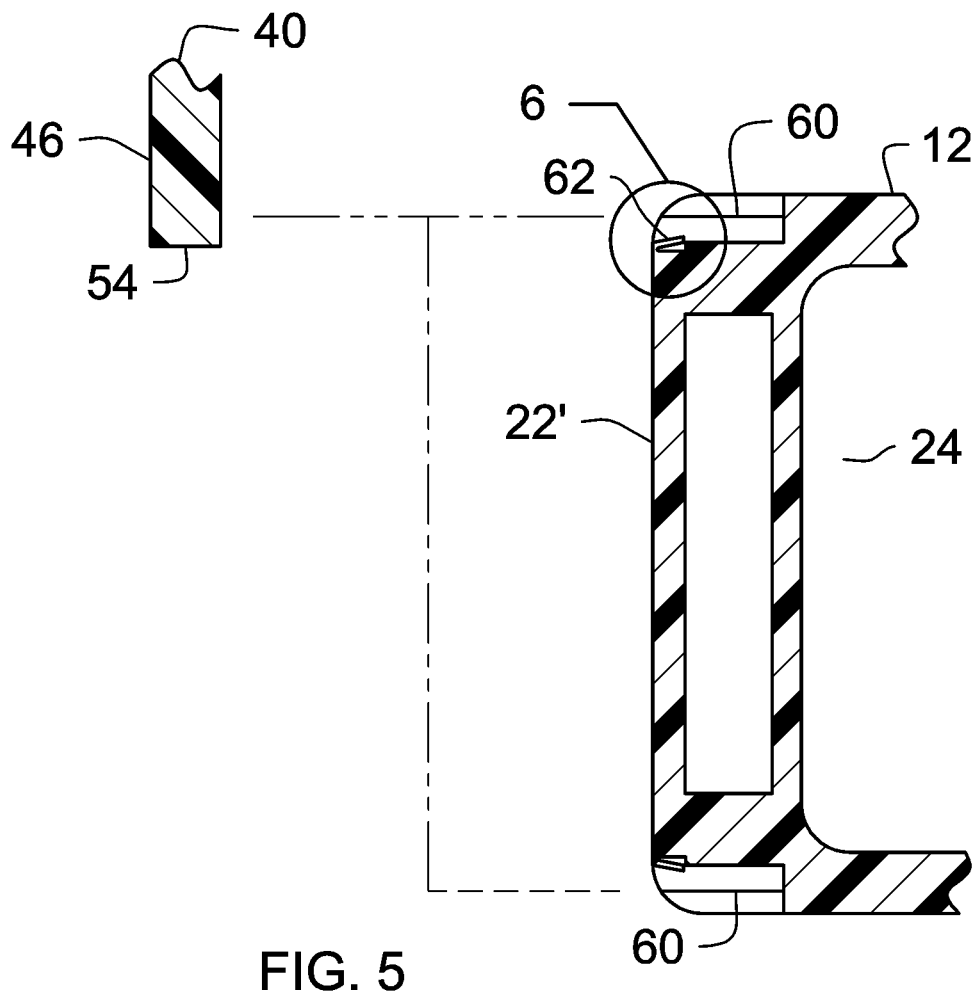
FIG. 5 is a cross sectional view of the combined retractable leash and ball thrower of the present invention, taken along line 5-5 in FIG. 4.
Figure 6:
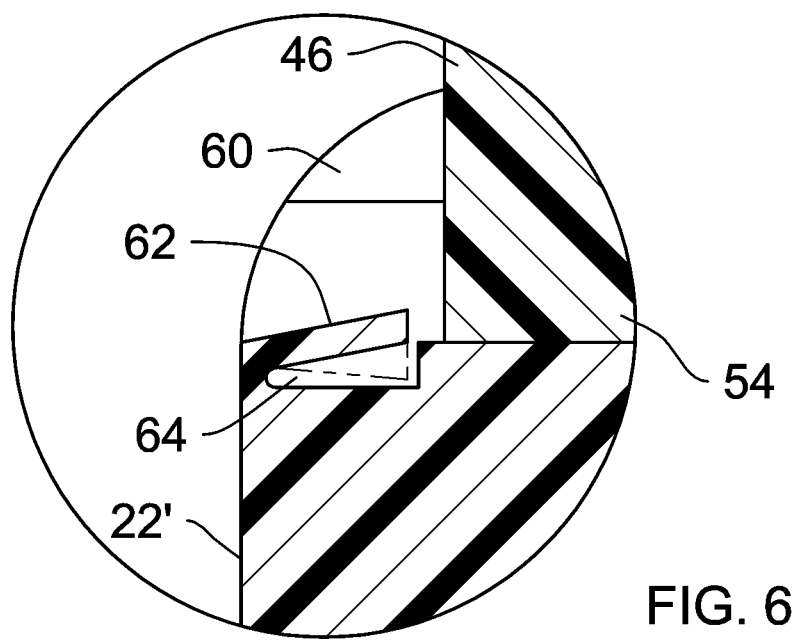
FIG. 6 is an enlarged cross sectional view of an alternate connection of the combined retractable leash and ball thrower of the present invention, of FIG. 5.

The T-shaped detent 54 is securely locked in the T-shaped slot 60 by a biased latch 62, as best illustrated in FIGS. 5 and 6. The T-shaped detent 54 is slidably inserted into the T-shaped slot 60 from a rear surface of the handle 22'". When the T-shaped detent 54 is inserted, a bottom surface of the T-shaped detent 54 forces the latch 62 into a recess 64 defined in the T-shaped slot 60. The biasing nature of the latch 62 will force the latch 62 back into the T-shaped slot 60 when the T-shaped detent 54 is moved passed the latch 62, thereby preventing the shaft 40 from being removed from the handle 22''''. To remove the shaft 40 from the handle 22'''', the user would press in the latch 62, and then slide the shaft 40 out from the T-shaped slot 60. It can be appreciated that varying number and style of latches can be used.

Figure 7:
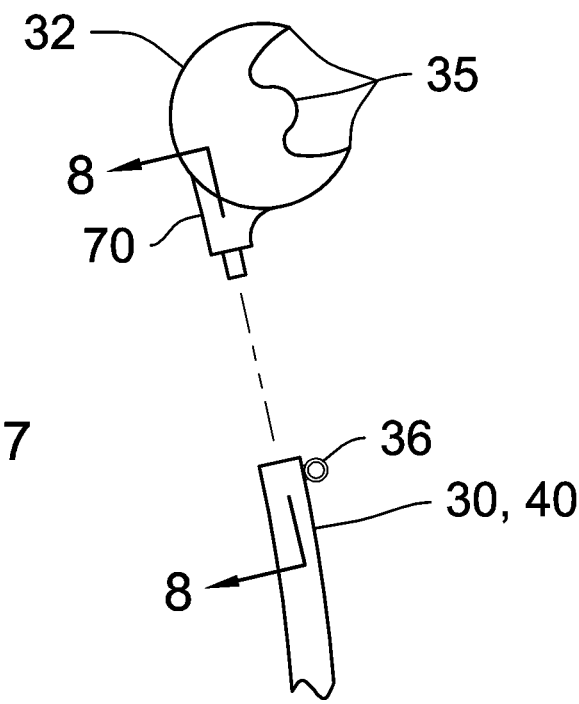
FIG. 7 is an exploded side plane view of an alternate embodiment ball receiving element and shaft of the combined retractable leash and ball thrower of the present invention.

Referring to FIG. 7, the ball receiving element 32 may be removably attached to a distal end of the shaft 30, 40 opposite the handle 22 and/or the attachment end 46. The ball receiving element 32 has an attachment end 70 that is removably inserted into the distal end of the shaft 30, 40. This allows the user to interchange between different size and configuration ball receiving elements 32, allowing for the use of different size and shaped balls or objects to be thrown.

Figure 8:
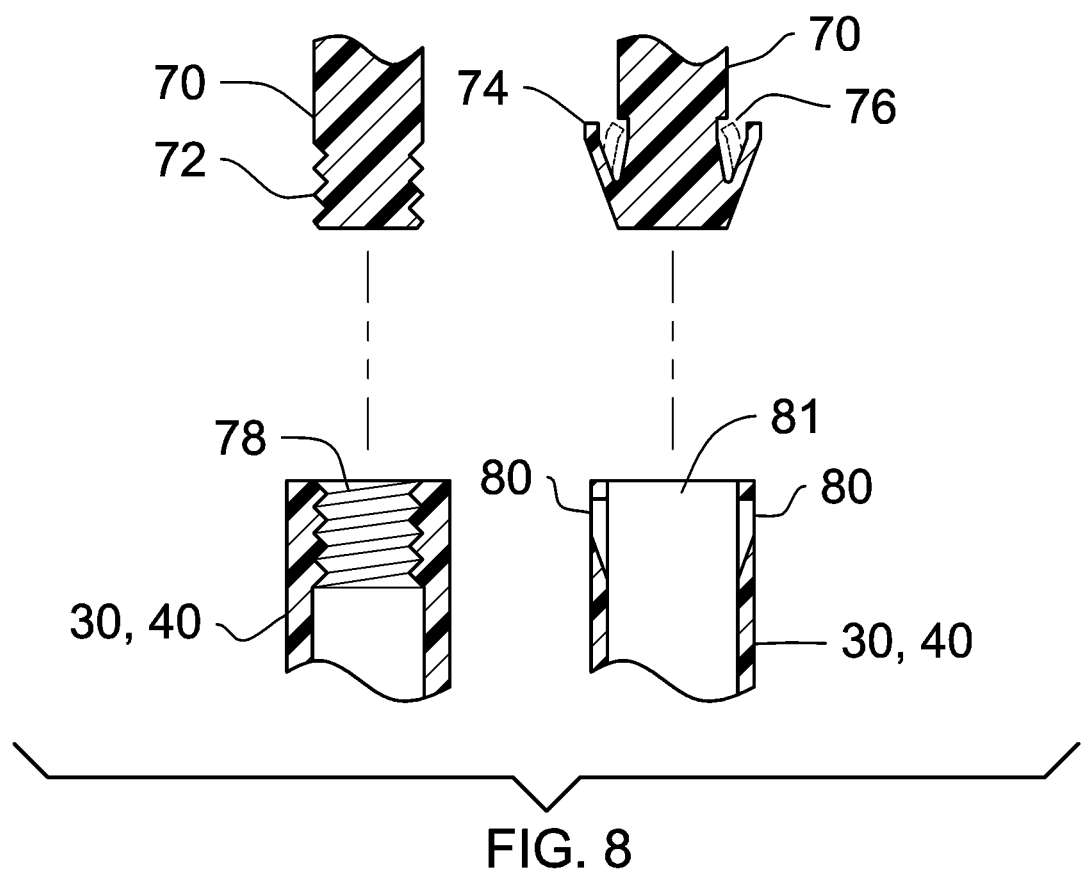
FIG. 8 is a cross sectional view of alternate ball receiving element and shaft connections of the combined retractable leash and ball thrower of the present invention, taken along line 8-8 in FIG. 7.

One embodiment of the attachment end 70 of ball receiving element 32 features an externally threaded section 72 that securely engages with an internally threaded bore 78 defined in the distal end of the shaft 30, 40, as best illustrated in FIG. 8. The threaded section 72 of the ball receiving element 32 is inserted into the threaded bore 56 of the shaft 30, 40, and then rotated so as to securely and removably attach the ball receiving element 32 to the shaft 30, 40.

Another embodiment of the attachment end 70 of the ball receiving element 32 features biased latching tabs or buttons 74 that securely engages with latch openings 80 defined in opposite sides of the distal end of the shaft 30, 40. The attachment end 70 of the ball receiving element 32 is inserted into a bore 81 defined in the distal end of the shaft 30, 40. The latch openings 80 are in communication with the bore 81. The walls of the distal end of the shaft 30, 40 that define the bore 81 force the tabs 74 into recesses 76 defined in the attachment end 70 when the attachment end 70 is inserted into the bore 81 of the shaft 30, 40. The biasing nature of the tabs 74 will force them into their respective opening 80 when the tabs 74 are aligned therewith, thereby securing the ball receiving element 32 to the distal end of the shaft 30, 40. To remove the ball receiving element 32 from the shaft 30, 40, the user would press in the tabs 74 so they are inside the bore 81, and then remove the ball receiving element 32 from the bore 81. It can be appreciated that varying number and style of tabs can be used, thereby providing the user the ability to rotate the ball receiving element 32 in multiple orientations.

Figure 9:
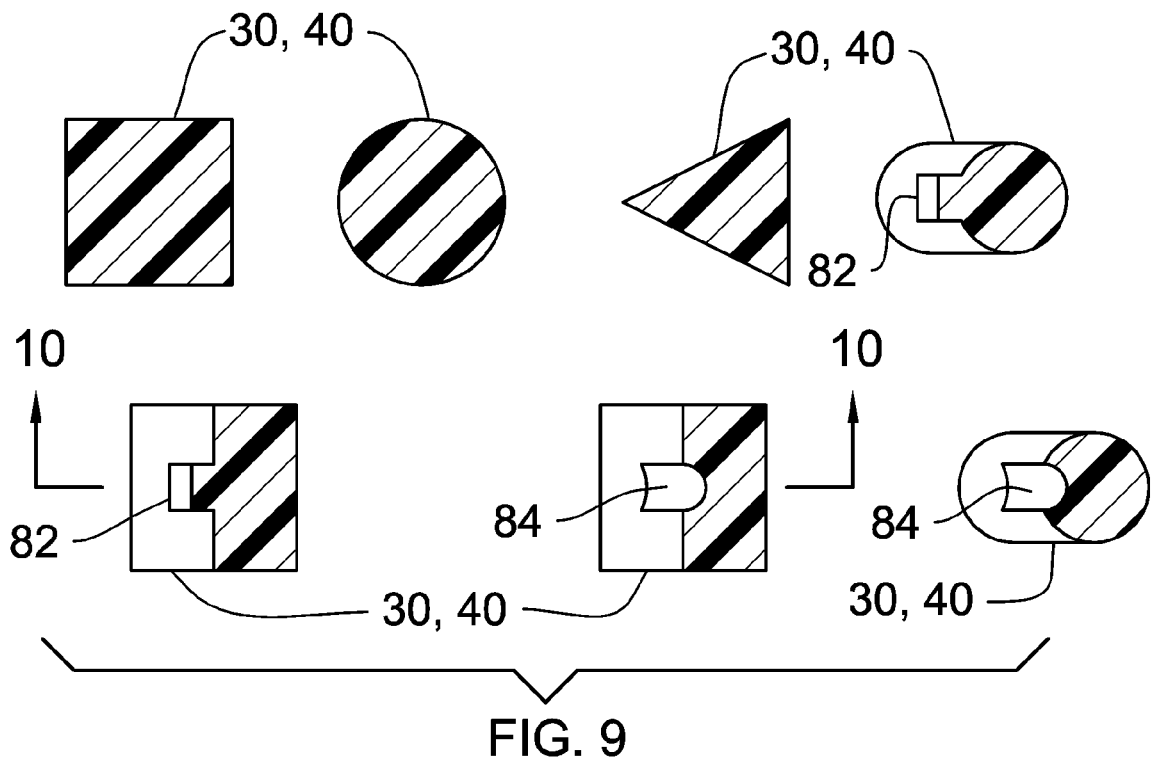
FIG. 9 is a cross sectional view of alternate embodiment shafts of the combined retractable leash and ball thrower of the present invention.
Figure 10:
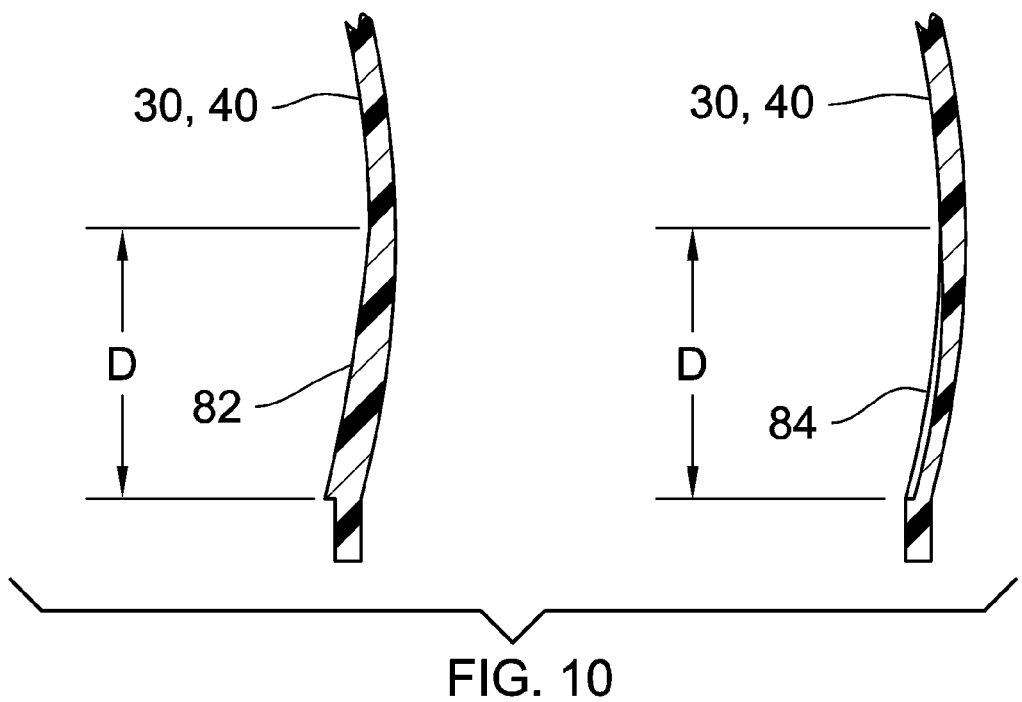
FIG. 10 is a cross sectional view of the alternate embodiment shafts of the combined retractable leash and ball thrower of the present invention, taken along line 10-10 in FIG. 9.

The shaft 30, 40 may be of varying configurations, as best illustrated in FIG. 9. The shaft 30, 40 may have substantially, but not limited to, a square, rectangular, circular, oval, triangular, or polygonal configuration. Additionally, the shaft 30, 40 may include a ridge 82 or groove 84 running a predetermined distance D along one or both sides of the shaft 30, 40. The ridge 82 or groove 84 would alter the rigidity or flexibility of the shaft 30, 40 in relation to the distance D of the ridge 82 or groove 84, as best illustrated in FIG. 10. It can be appreciated that a greater distance D of the ridge 82 or groove 84 would result in a more rigid or less flexible shaft 30, 40, compared to a lesser distance D. Varying lengths, dimensions, thickness, diameters, and configurations of the shaft 30, 40 can be used to alter the rigidity or flexibility of the shaft 30, 40.

In use, it can now be understood that combined retractable leash and ball thrower has at least two operational positions while the user grasps the handle. The operational positions are an animal walking position with the button in a generally upward orientation with the ball throwing shaft oriented generally to the ground, and a ball throwing position with the ball throwing shaft orientate generally upwardly with the button oriented generally to the ground. It can be appreciated that the ball can be thrown in an underhanded orientation with the shaft facing toward the ground, or a side arm orientation with the shaft substantially parallel with the ground. In the animal walking position, the user would attach the clip of the leash to an animal's collar (not shown) and walk or train the animal as desired. In the ball throwing position, the user would disconnect the clip from the animal's collar and place a ball in the ball receiving opening of the ball receiving element or use the shaft to pick up the ball from the ground, and then in a whipping, swinging or rotary motion toss the ball out of the ball receiving element.

Since the button can be located opposite of the shaft, the user will not accidently operate the button and leash retracting mechanism while using the combined retractable leash and ball thrower in the ball throwing position.

In an alternate embodiment, the user has the option of removing the shaft and using the ball throwing element separately from the housing. This provides the user the option of changing the location of the shaft, and for removing the shaft and using the housing as a standard retractable leash, without the shaft being an obstruction. The user can attach different shafts to the housing.

In a further alternate embodiment, the user has the option of using different ball receiving elements that are attachable to the shaft.

While embodiments of the combined retractable leash and ball thrower have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material may be used instead of the materials herewith described. And although for allowing a user to throw a ball and walk an animal have been described, it should be appreciated that the combined retractable leash and ball thrower herein described is also suitable for picking up objects, guiding animals, and training animals.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combined retractable leash and ball thrower comprising:
   a housing featuring a handle, and a bore defined in said handle;
   a leash retracting mechanism enclosed in said housing;
   an activation element for operating said leash retracting mechanism, said activation element having a portion thereof exterior of said housing;
   a shaft extending from said handle of said housing, said shaft having an attachment end removably received in said bore; and
   a ball receiving element located at a distal end of said shaft opposite said handle.

2. The combined retractable leash and ball thrower according to claim 1, wherein said shaft extends from a side of said housing opposite said activation element.

3. The combined retractable leash and ball thrower according to claim 1 further comprising a circular extension protruding from said shaft.

4. The combined retractable leash and ball thrower according to claim 1, wherein said attachment end of said shaft includes a threaded portion, and wherein said bore defined in said handle includes a threaded portion corresponding with said threaded portion of said attachment end of said shaft.

5. The combined retractable leash and ball thrower according to claim 1, wherein said attachment end of said shaft includes at least one biased tab, and wherein said handle defines at least one opening in communication with said bore and being configured to receive said tab therein.

6. The combined retractable leash and ball thrower according to claim 1, wherein said attachment end of said shaft includes a T-shaped detent extending from said distal end, and wherein said bore defined in said handle has a substantially T-shape corresponding with said T-shaped detent of said attachment end of said shaft, said T-shaped bore of said handle being in communication with the exterior of said handle allowing said T-shaped detent to be slidably received therein.

7. The combined retractable leash and ball thrower according to claim 6, wherein said handle further comprising a biased latch located in said T-shaped bore at a position which securely retains said T-shaped detent in said T-shaped bore.

8. The combined retractable leash and ball thrower according to claim 1, wherein said ball receiving element further comprising an attachment end that is removably received in a bore defined in said distal end of said shaft.

9. The combined retractable leash and ball thrower according to claim 8, wherein said attachment end of said ball receiving element includes a threaded portion, and wherein said bore defined in said distal end of said shaft includes a threaded portion corresponding with said threaded portion of said attachment end of said ball receiving element.

10. The combined retractable leash and ball thrower according to claim 8, wherein said attachment end of said ball receiving element includes at least one biased tab, and wherein said distal end of said shaft defines at least one opening in communication with said bore of said shaft and being configured to receive said tab of said attachment end of said ball receiving element therein.

11. The combined retractable leash and ball thrower according to claim 1, wherein said shaft further comprising a ridge along a predetermined distance of said shaft.

12. The combined retractable leash and ball thrower according to claim 1, wherein said shaft further comprising a groove along a predetermined distance of said shaft.

* * * * *